Feb. 18, 1969 G. F. LYON 3,428,820

ELECTRORESPONSIVE CONTROLS

Filed May 19, 1966

INVENTOR
GARY F. LYON

BY Mueller, Aichele & Rauner

ATTYS.

United States Patent Office 3,428,820

Patented Feb. 18, 1969

3,428,820

ELECTRORESPONSIVE CONTROLS

Gary F. Lyon, Tempe, Ariz., assignor to Motorola, Inc., Franklin Park, Ill., a corporation of Illinois Filed May 19, 1966, Ser. No. 551,269

U.S. Cl. 307—64 9 Claims

Int. Cl. H02j 9/06

Figure 1:
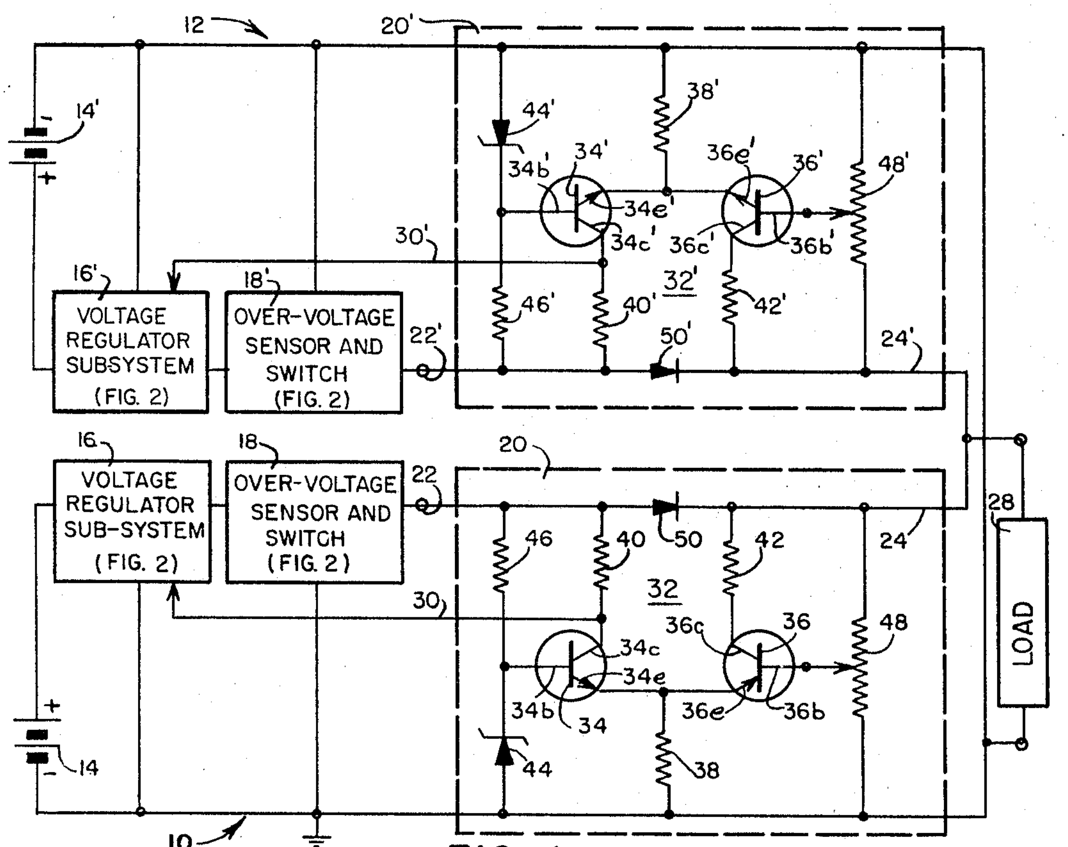

This invention relates to electroresponsive controls which selectively activate one of two subsystems, such as voltage regulators, for performing a desired function within a system which selection is dependent upon the respective subsystem performance.

In complex electronic systems it is desired to have a high degree of reliability. One approach to improved reliability is to provide redundant components and subsystems. Care has to be exercised to ensure that the redundancy contributes to rather than detracts from the reliability of the system.

Electronic systems may have redundancy in the form of parallel operation of two identical electronic components or subsystems. Such redundancy does not always provide complete protection against catastrophic failures and therefore does not always improve reliability. For example, in supplying power to electronic systems two parallel power supplies can be used. Isolating diodes to separate the supplies are required. Such diodes being on the load side of the supply add a series resistance which degrades regulation. In protecting the system against an over-voltage complex protective circuits may be required which detract from realiability or the supply developing on over-voltage will dominate the system.

Another approach to improved realiability through redundancy is to use a so-called adaptive control system. In such a system, one of the two identical components or subsystems is providing a complete desired operation to the electronic system. An adaptive or electroresponsive control monitors the operation of the activated or operating subsystem. When the activated subsystem no longer provides the desired operation, the adaptive control automatically activates and switches the other subsystem into the electronic system and de-activates the failing subsystem. The component or subsystem performing the desired operation operates at designed efficiency.

Performance of the above described operations, including monitoring the subsystem operation, has required an additional set of controls. As controls are added to an electronic system reliability is reduced. As such, the adaptive approach to providing improved reliability through redundancy is often defeated.

Therefore, it is an object of this invention to provide an adaptive elctroresponsive control of simple construction for use in an electronic system having plural subsystems which automatically switches one subsystem into operation while switching another subsystem out of operation.

It is another object of this invention to provide an electroresponsive control switching between subsystems in an electronic system wherein components constituting the control perform additional functions.

It is a further object of this invention to provide an electroresponsive switch for switching between two subsystems within an electronic system which has a minimum number of components.

It is still another object of this invention to provide a power supply having two regulators which can be adaptively switched in and out of operation according to the regulator performance and which also provides high voltage protection for each regulator independent of the other regulator.

It is a still further object in conjunction with the preceding object to have an adaptive switching control also provide signals controlling the voltage regulator supplying power.

It is still further object of this invention to provide an electroresponsive adaptive control for a voltage regulator system involving two independent voltage regulators which are adaptively switched on and off wherein the control is integrated with the respective regulator and requires no additional parts within each regulator over a regulator operating by itself.

This invention provides a pair of voltage comparators each receiving an electrical voltage from respective subsystems, such as in its preferred embodiment, a voltage regulator. The corresponding currents are respectively passed through the comparators to a common connection, and thence to the load. Each regulator provided voltage magnitude is an indication of the regulator operation.

The comparators each have a control connection back to the respective regulator whereby only one of the two regulators will provide current to the load. When the one providing such current no longer can provide the current, as indicated by a loss in voltage, for example, its voltage comparator senses such condition. The other regulator is electronically activated to provide a regulated voltage to the common connection such that when the one subsystem begins to turn off, the voltage comparators cooperate to rapidly turn the one regulator off and simultaneously activate the other regulator to provide the current to the load. The above described operation is termed "adaptive" in that the power supply system automatically selects the better voltage regulating subsystem, i.e., adapts itself to provide the best possible operation.

Additionally, interposed between each comparator and its connected regulator there is an overvoltage sensor and switch which senses the regulator operation with respect to an over-voltage. Such sensing and switching is independent of the comparators except that when the over-voltage switch interrupts the regulator subsystem supplied voltage, the comparators immediately cooperate with each other to switch operation to the other voltage regulator.

Such adaptive switches may find application in other than redundant power supply systems, as described above.

Figure 2:
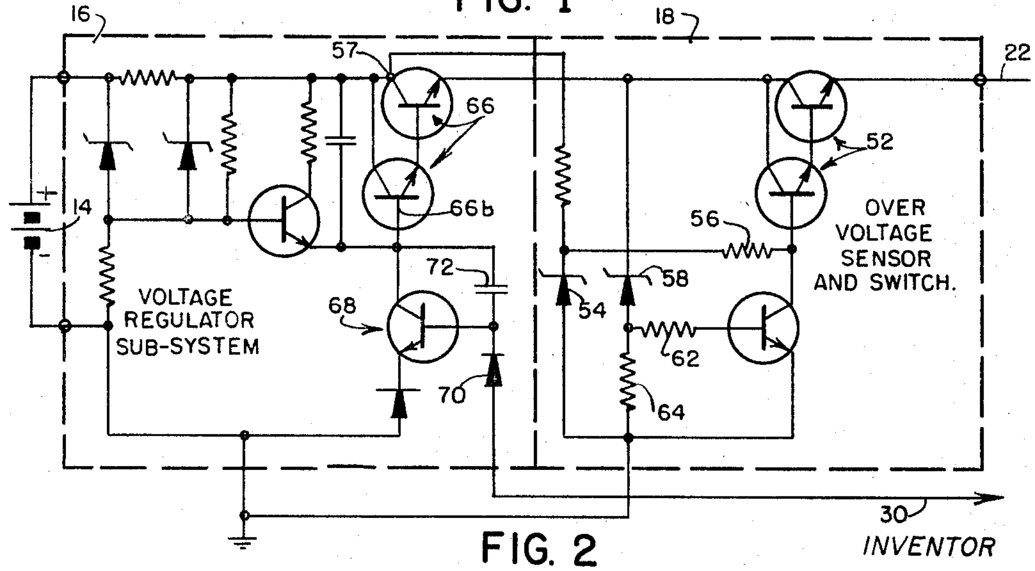

Referring now to the accompanying drawing:

FIG. 1 is a mixed schematic and block diagram of an exemplary embodiment of the present invention involving a redundant power supply system having voltage regulators that are automatically switched on and off depending on their respective performances; and FIG. 2 is a schematic diagram of a typical voltage regulator and an over-voltage sensor and switch which may be used in connection with the FIG. 1 illustrated circuit.

Referring now to FIG. 1 there is illustrated two identical power supplies 10 and 12. The same numerals have been used to identify like parts and features in the supplies excepting wherein supply 12 is specifically referred to the numeral is primed, i.e., 22' as opposed to 22. The description following will describe power supply 10 it being understood that such description is equally applicable to power supply 12.

The unregulated power source 14 provides power to be regulated to voltage-regulator subsystem 16. Although the source 14 is illustrated as a battery it can be a source of any known type. The regulated voltage is provided to over-voltage sensor and switch 18. Thence the regulated power is supplied through comparator and automatic switch control 20, hereinafter termed "comparator," from whence it is supplied to common connection 26 for load 28.

Comparator 20 receives the power on its internal input line 22 and emits the power on its external input line 24. In this embodiment the comparator input line 24 also carries the power supply 10 output power for load 28. Line 24 is so termed because it receives an input voltage from power supply 12 during adaptive switching operations, as will be hereinafter fully described.

Comparator 20 also provides a voltage regulating control signal over its output line 30 to voltage regulator system 16 such that the regulater power provided thereby is controlled by the signal on line 30. Additionally, the signal on line 30 indicates to regulator system 16 when it should deactivate during an adaptive switching operation.

Comparator 20 consists of a differential amplifier 32 having transistors 34 and 36 each with the respective electrodes: collectors 34C and 36C, bases 34B and 36B, and emitters 34E and 36E. Resistor 38 electrically couples the commonly connected emitters 34E and 36E to ground reference potential. Resistors 40 and 42 are respectively the collector loads of transistors 34 and 36. Collector 34C is connected to line 30 for providing the regulating control signal to regulator 16.

Zener diode 44 is connected to base 34B for providing a constant reference potential to transistor 34 which determines the regulated output voltage magnitude. Current supplied through resistor 46 from internal input 22 provides base drive current for transistor 34. Current flowing from collector 34C through transistor 34 provides a bias voltage on emitters 34E and 36E due to the voltage drop in resistor 38.

The load 28 voltage, i.e., the voltage to be maintained at a predetermined amplitude, is measured through potentiometer 48 by transistor 36. Transistor 36 feeds the measured voltage to the differential amplifier by controlling the current magnitude through the series circuit consisting of resistor 42, transistor 36 and the common resistor 38. As the load voltage increases transistor 36 conductivity is increased to increase current through resistor 38 and thus the voltage drop thereacross. This action reduces the conductivity of transistor 34 (base voltage on transistor 34 is constant because of Zener diode 44 and with increased emitter voltage conductivity is reduced). This action increases the voltage on collector 34C which is reflected to regulator 16 for decreasing its output voltage. An opposite change in load voltage causes a corresponding increase in regulator 16 output voltage, such that the load voltage is maintained relatively constant.

Diode or unilateral current conducting device 50 is interposed between internal input line 22 and external input line 24 of comparator 20, which in combination with the above described circuits and the other power supply 12 provides adaptive switching between the two voltage regulator subsystems 16 and 16′. When regulator 16 is providing current to load 28, as above described, diode 50 is forward biased into conduction and, therefore, does not enter into operation of the power supply voltage regulation. Diode 50 additionally is used to isolate the supply from supply 12 when supply 12 is supplying power. Diode 50 is positioned such that it is not between load 28 and base 36B of comparator 20, therefore, diode 50 impedance does not affect regulation.

The adaptive type of switching action will now be described. Assume that power supply 10 is providing current to load 28. Also power supply 12 is inactive such that it supplies no current therefore its diode 50′ is biased to current cutoff. Next assume that the voltage of regulator 16 providing voltage at internal input 22 is reduced and that regulator 16 does not respond to comparator 20 to increase its voltage. It follows that the load voltage is correspondingly reduced to reduce the voltage on line 24′ causing differential amplifier 32′ to decrease its voltage drop across resistor 38′. Such action increases the base drive to transistor 34′ reducing collector 34C′ voltage. Such reduction is supplied over line 30′ to regulator 16′ which in response increases its voltage amplitude. This increase in turn further increases transistor 34′ conductivity and the action is regenerative until power supply 12 is supplying the full desired voltage magnitude to line 24′. Such voltage is in turn supplied to external input line 24 of comparator 20 to increase the conductivity of transistor 36 in amplifier 32. Such action decreases the conductivity of transistor 34 for increasing the voltage on its collector 34C and thence the voltage on line 30. Regulator 16 of power supply 10 reacts to the increase of line 30 voltage to further reduce its output voltage such that the power to load 28 is quickly switched from power supply 10 to power supply 12 by the regenerative combined switching action of comparators 20 and 20′ as jointly driven by the regulator subsystems 16 and 16′.

In the above described manner load 28 continues to receive substantially the desired voltage irrespective of the failure of regulator 16. It should be noted that the circuitry required to perform this fast switching action is approximately the same per power supply as that required for a single power supply without such adaptive switching features.

When initially turning on both power supplies it is not necessary to turn one on before the other. The regulators 16 and 16′ innately will have a different gain causing one of the regulators to reach its regulated voltage magnitude before the other keeping the other regulator inactive. The power supplies are kept from randomly reswitching by the voltage hysteresis in transistors 34 and 34′. That is, the voltage required to change the conductivity state of such transistors from current cutoff to current conduction is different than that required for switching to current cutoff from current conduction. Therefore, switching between power supplies occurs only when the power supply providing the current reduces its output voltage such that the hysteresis level is reached.

When power supply 10 is deactivated, i.e., provides a voltage less than supply 12 and therefore no power, diode 50 is reversed biased to non-conduction. The desired voltage magnitude is supplied to comparator 20 by supply 12 over line 24 indicating to regulator 16 that the regulated voltage on load 28 is at its desired amplitude. Regulator 16 is therefore inhibited from increasing its output voltage. The actual voltage output supplied by regulator 16 is determined by its design and that of comparator 20.

Referring now to FIG. 2, over-voltage sensor and switch 18 includes a Darlington connected transistor switch 52 forming the electrical connection from regulator 16 to internal input line 22. Switch 52 is normally driven to current conduction saturation. Zener diode 54 has a reverse current conduction threshold less than the expected regulator 16 voltages which are then supplied to switch 52 through resistor 56 for keeping the switch at current saturation conductivity. Because over-voltages are to be detected such Zener 54 voltage is obtained from regulator 16 at point 57 which is on the unregulated side thereof and effectively is connected to the source 14.

Over-voltage sensing Zener diode 58 is normally nonconductive in the reverse direction. Transistor 60 is therefore non-conductive permitting base 52B of switch 52 to be at the voltage of point 57. Resistor 62 and resistor 64 connected to ground form the base drive circuit for transistor 60. When an excessive voltage is provided by battery source 14, Zener diode 58 begins to conduct causing a voltage drop across resistor 64 and thence driving transistor 60 into current saturation. This action drives the base control voltage of switch 52 to ground reference potential and quickly drives the switch to current cutoff isolating regulator 16 from its load and comparator 20.

Returning momentarily to FIG. 1 when such desired voltage and current is no longer supplied by regulator 16 to internal input line 22, comparators 20 and 20′ cooperate to immediately switch from power supply 10 to power supply 12 as previously described.

Regulator 16 as illustrated in FIG. 2 is of known design. Voltage regulation is provided by variable impedance 66 consisting of a Darlington connected amplifier. Transistor amplifier 68 receives a voltage regulating control signal from line 30 through diode 70. Capacitor 72 passes any sudden changes to the control input 66B of variable impedance 66.

It will be remembered that an increase in load 28 voltage causes an increased line 30 voltage. As the voltage on line 30 increases, the transistor 68 conductivity will correspondingly increase reducing the voltage on control input 66B. Such reduced voltage decreases the conductivity of variable impedance 66 which then reduces the voltage magnitude supplied to sensor 18. Operation of regulator 16 accordingly follows the usual design practice and will not be further discussed, it being sufficient to say that a regulator of known design is satisfactory for use in the preferred embodiment.

From the above description it is concluded that this invention has very simply provided a redundant pair of power supplies each being constructed with substantially the same number of components as that required by a single power supply unit and yet there has been provided all the protective features of a single power supply plus adaptive switching between the two power supplies for providing improved reliability in a total power supply system. Further, the adaptive switching can be applied with equal facility to other electronic systems having plural subsystems for adaptively switching therebetween. While the preferred embodiment shows switching between two identical subsystems no limitation thereto is intended, such adaptive switching may be applied to switch between two dissimilar subsystems.

What is claimed as applicant's invention is:

1. An electroresponsive switching network for a system to be selectively deactivated, which system includes means for supplying an electrical voltage indicative of system operation and control means for deactivating such system in response to a control signal, and activating the system in response to a second control signal, the improvement includes, in combination:

controlling voltage supply means adapted to receive current when a voltage amplitude applied thereto exceeds a certain threshold and to supply current when such voltage applied is below such threshold; and an electroresponsive network including, in combination:

voltage comparison means having an internal input connected to the system voltage supply means, and an external input connected to said controlling voltage supply means for supplying and receiving current therefrom, and a control output connected to the control means and being responsive to signals on said inputs such that an output signal is provided on the control output indicative of the relationship of the voltages on said inputs, a unilateral current conducting device connecting the inputs and arranged to conduct current from one input towards another input and to block current tending to flow towards said one input from said another input, said comparison means being operative to supply the first signal for causing the control means to deactivate the system whenever a voltage on said external input has a magnitude relationship to a voltage on said internal input indicative that the system is to be deactivated and further having a hysteresis characteristic such that the system when deactivated is not supplied to the second signal and reactivated until the voltage magnitude on the inputs have a relationship different than that required for deactivating an active system, and when said system is deactivated the unilateral device is non-conductive for isolating said voltage supply means one from the other.

2. The combination of claim 1 wherein the system is a voltage regulator system connected to the comparison means for supplying current to a load connected to the external input and being responsive to the comparison means while being active to supply such load current to regulate the load voltage in accordance with voltages on said inputs.

3. The combination of claim 1 wherein said reference current means constitutes a second electroresponsive switching network for being coupled to a second system having means for supplying an electrical voltage indicative of the second system operation and second control means for selectively de-activating the second system in response to a predetermined signal, said second switching network including in combination:

second voltage comparison means having a second internal input connected to the second system voltage supply means, a second external input connected to the first mentioned external input, and a second control output connected to the second control means, and being responsive to signals on said second inputs such that an output signal is provided on the second control output which is indicative of the relationship of the signals on said second inputs, a second unilateral current conducting device connecting the second inputs and poled to conduct current from one second input towards another second input and to block current tending to flow towards said one second input from said another second input, and said second comparison being operative for causing the second system control means to deactivate the second system whenever a voltage on said second external input has a magnitude relationship to a voltage on said second internal input indicative that said second system is to be deactivated and having a hysteresis characteristic such that the second system responds to voltages on said second inputs in a manner similar to the first mentioned comparison means responds to voltages on the first mentioned inputs.

4. The combination of claim 2 wherein each electroresponsive switching network further includes, interrupt means for deactivating its respective system in response to its respective system electrical voltage changing beyond an interrupt threshold towards a magnitude in direction other than toward said indicative voltage magnitude relationship, such that either system is permitted to operate to supply an indicating voltage between said indicative relationship and another interrupt threshold.

5. The combination of claim 3 wherein said systems are voltage regulator systems for respectively supplying electrical energy to a load through the respective comparison means and wherein the regulator-comparator combination each constitutes a regulated power supply.

6. The combination of claim 5 wherein either regulator when activated will provide substantially the same voltage and current magnitudes to a given load.

7. The combination of claim 6 wherein the unilateral current conducting unit within each comparator consists of a semiconductor diode.

8. The combination of claim 7 further including in each of the supplies an over-voltage sensor and interruptor electrically interposed between the regulator and voltage comparator internal input for interrupting the flow of electrical current between the regulator and comparator, each comparator being operative to respond to such interruption such that another supply is quickly activated for supplying the desired current and voltage magnitudes.

9. The combination of claim 8 wherein the voltage comparator in each of the supplies is formed by the combination: first and second transistors each having a common electrode which are connected with each other, a control electrode and another electrode, a semiconductor diode constitutes said unilateral device and having first and second electrodes respectively connected to the internal and external inputs of its respective comparator, first and second resistors respectively having one end electrically connected to said another electrodes of said first and second transistors and with their opposite ends respectively and electrically connected to the first and second diode electrodes, voltage dividing means connecting said diode second electrode to the second transistor control electrode for supplying a portion of external input voltage thereto, said another electrode of said first transistor being connected to its respective comparator control output for controlling the output voltage magnitude of its respective regulator, voltage reference means connecting the internal input to the first transistor control electrode for providing a reference potential thereto, a ground reference potential in each supply, a resistor connecting said common electrodes of the transistors to said ground reference potential, and the combination being such that the voltage comparator provides control voltages to its respective regulator for supplying regulated power to the respective external inputs and being further operative to switch operation from one supply to the other when said regulator is improperly functioning.

References Cited

UNITED STATES PATENTS

| | | | |
|---|---|---|---|
| 3,201,592 | 8/1965 | Reinert et al. | 307—64 |
| 3,341,748 | 9/1967 | Kammiller | 307—130 X |

ROBERT K. SCHAEFER, *Primary Examiner.*

H. J. HOHAUSER, *Assistant Examiner.*